US012563435B2

(12) United States Patent
Lourdu Raja et al.

(10) Patent No.: US 12,563,435 B2
(45) Date of Patent: Feb. 24, 2026

(54) METHODS FOR PROFILE BASED MANAGEMENT OF INFRASTRUCTURE OF A CLOUD USED FOR RAN APPLICATIONS

(71) Applicant: Mavenir US Inc., Richardson, TX (US)

(72) Inventors: Charles Santhosam Lourdu Raja, Bangalore (IN); Prashanth Candade, Bangalore (IN)

(73) Assignee: Mavenir US Inc., Richardson, TX (US)

( * ) Notice: Subject to any disclaimer, the term of this patent is extended or adjusted under 35 U.S.C. 154(b) by 511 days.

(21) Appl. No.: 18/156,571

(22) Filed: Jan. 19, 2023

(65) Prior Publication Data

US 2023/0254727 A1 Aug. 10, 2023

(30) Foreign Application Priority Data

Feb. 5, 2022 (IN) .............................. 202221006242

(51) Int. Cl.
| | |
|---|---|
| *H04W 28/02* | (2009.01) |
| *H04W 84/04* | (2009.01) |

(52) U.S. Cl.
CPC ... *H04W 28/0231* (2013.01); *H04W 28/0215* (2013.01); *H04W 84/042* (2013.01)

(58) Field of Classification Search
CPC ........... H04W 84/042; H04W 28/0215; H04W 28/0231; G06F 3/067; G06F 3/0665;
(Continued)

(56) References Cited

U.S. PATENT DOCUMENTS

| | | | |
|---|---|---|---|
| 9,276,816 B1 | 3/2016 | Conte et al. | |
| 10,986,494 B1 * | 4/2021 | Farivar | ............... H04W 12/122 |

(Continued)

FOREIGN PATENT DOCUMENTS

EP 3783835 A1 2/2021

OTHER PUBLICATIONS

Extended European Search Report for corresponding European patent application EP 23154648.2, 11 pages, dated Jun. 28, 2023.
(Continued)

*Primary Examiner* — Jung Liu
(74) *Attorney, Agent, or Firm* — Ruggiero McAllister & McMahon LLC

(57) ABSTRACT

A method is presented which enables a controlled mechanism of applying the required set of settings, e.g., for cloud-based network infrastructure, by means of "profiles". Infrastructure Management Service (IMS) applies one or more of Compute profile, Networking profile, Storage profile, Accelerator profile, and Application ("App") profile to cloud infrastructure. The following set of procedures are defined to achieve the profile-based infrastructure management: a) profile definition; b) cloud-infrastructure-preparation based on profile(s); c) cloud audit and monitoring; and d) cloud preparation based on capability. Applying of a profile can involve one or more of: updating the BIOS settings, e.g., using Intelligent Platform Management Interface (IPMI) commands; updating the GRUB settings; updating the system/kernel parameters; updating interfaces (e.g., alias, bonding, etc.); creating required resources (e.g., virtual functions (VFs) and corresponding bindings); creating resource maps to be used by plug-ins; and running any scripts for custom needs of the RAN application.

20 Claims, 9 Drawing Sheets

(58) Field of Classification Search
CPC .. G06F 11/1464; G06F 3/0647; G06F 3/0649;
G06F 11/1469; G06F 3/065; G06F
11/1471; G06F 11/2033; G06F 11/1451;
G06F 11/1453; G06F 3/0619; G06F
11/1402; G06F 11/2028; G06F 11/1448;
G06F 3/0617; G06F 9/45558; G06F
11/1484
See application file for complete search history.

(56)          References Cited

U.S. PATENT DOCUMENTS

| | | |
|---|---|---|
| 12,141,535 B2 * | 11/2024 | Galitsky .................. G06N 3/08 |
| 2013/0346619 A1 | 12/2013 | Panuganty et al. |
| 2021/0135957 A1 | 5/2021 | Thakkar et al. |
| 2022/0171648 A1 * | 6/2022 | Rodriguez .......... G06F 9/45533 |
| 2023/0367624 A1 * | 11/2023 | Kumar .................... G06F 3/067 |

OTHER PUBLICATIONS

O-RAN Alliance "Cloud Platform Reference Design for Deployment Scenario B", O-RAN WG6. Cloud-Ref-B-v01.01 Technical Specification, 2020.

\* cited by examiner

```
####### Srv1_Mdfl Profile #########################
Srv1_Mdfl:
  bios:
    Virtualization_Technology : Enabled
    LLC_Prefetch : Enabled
    Turbo_Boost : Enabled
    Uncore_Frequency : Maximum
    Energy_Efficient_Policy : Performance grub:
    intel_iommu : on
    hugepagesz : 1G
    hugepages : 16
    isolcpus : 3-51,55-103 sysparam:
    kernel.msgmnl : 512
    kernel.msgmax : 26194304
    kernel.msgmnb : 263886080
    fs.file-max : 6242880
    fs.nr_open : 6242880
```

FIG. 3

```
####### DU Profile #############
du_profile:
  bios:
    Configurable_TDP : Level2
    X2APIC_Mode : Enabled script:
    name: wrmsr.sh_c
```

```
## CaaS Profile ########################
caas:
  components:
    kubernetes: 1.19.6
    etcd: 3.3.22
    helm3: 3.5.2
    coredns: 1.7.0
    cni:
      calico : 3.14.1
      multus : 3.6
```

```
#### PaaS Profile ########## paas:
  components:
    prometheus: 2.22.1
    grafana: 7.3.5
    elasticsearch: 1.12.0
    kafka: 2.6.0
```

METHODS FOR PROFILE BASED MANAGEMENT OF INFRASTRUCTURE OF A CLOUD USED FOR RAN APPLICATIONS

BACKGROUND OF THE INVENTION

The present disclosure relates to Radio Access Network (RAN) for 4G- and 5G-based mobile networks, and relates more particularly to configuration and management of 4G and 5G network nodes.

Private and Public Cloud vendors each have their own distinctive mechanisms for implementing infrastructure management. Standard-setting (i.e., specification) bodies such as Open-RAN (O-RAN) Alliance working group 6 (WG6) are addressing the issue of standardization of hardware specifications across software implementations to simplify physical deployment and maintenance. Typically, in a Cloud-based deployment, the software and hardware are decoupled, thereby enabling usage of multitude of white-box hardware that can support deployment of 2G, 3G, 4G, Narrowband Internet of Things (NBIOT) and 5G RAN solutions, for example. Infrastructure Management Services (IMS) are entities that handle the management and orchestration of the infrastructure such as compute, networking, and accelerator cards. Cloud Radio Access Networks (CRAN) are networks in which a significant portion of the RAN layer processing is performed at a central unit (CU) and a distributed unit (DU), both of which can be part of the baseband unit (BBU), depending on the functional split. CUs are usually located in the cloud on commercial off-the-shelf servers, while the radio frequency (RF) and real-time critical functions can be processed in the remote radio unit (RRU, also interchangeably referenced as RU).

With the existing procedures, the preparation of the infrastructure of the cloud (consisting of various white-box nodes) with a specific configuration and validation of the infrastructure are done manually using method of procedures (MOPs) or based on documentation. This approach can often lead to problems during deployment, e.g., mismatch of parameters on cloud not matching RAN node requirements or adaptation of deployment attributes for RAN according to cloud infrastructure characteristics. In addition, this manual method is also error-prone because human actions are needed and is not scalable to large deployments often involving thousands of infrastructure elements that are spread across Central and Edge data centers.

Therefore, there is a need for a common deployment environment on the Cloud irrespective of the underlying hardware used, i.e., a need for a method to ensure that the cloud is prepared according to specified configuration in a standardized data model and monitored to ensure compliance.

SUMMARY OF THE INVENTION

According to an example embodiment of the present disclosure, a method is presented which enables a common deployment mechanism of i) applying the required set of settings, e.g., for cloud-based network infrastructure, by means of "profiles" and/or data models, and ii) monitoring the settings to ensure that these settings are compliant before deploying RAN NFs.

According to an example embodiment of the present disclosure, profiles can be categorized into, e.g., Compute, Networking (or network), Accelerator, Storage and Application ("App") types.

According to an example embodiment of the present disclosure, Infrastructure Management Service (IMS) applies one or more of Compute profile, Networking profile, Storage profile, Accelerator profile, and Application ("App") profile to cloud infrastructure.

According to an example embodiment of the present disclosure, the following set of procedures are defined to achieve the profile-based infrastructure management: a) profile definition; b) cloud-infrastructure-preparation based on profile(s); c) cloud audit and monitoring; and d) cloud preparation based on capability.

According to an example embodiment of the present disclosure, applying of a profile can involve one or more of the following actions: update the BIOS settings, e.g., using Intelligent Platform Management Interface (IPMI) commands; update the GRUB settings; update the system/kernel parameters; update interfaces (e.g., alias, bonding, etc.); create required resources (e.g., virtual functions (VFs) and corresponding bindings); create resource maps to be used by plug-ins; and run any scripts for custom needs of the RAN application.

According to an example embodiment of the present disclosure, in addition to preparing a cloud infrastructure based on specific Hardware (HW) profiles, generic profiles, i.e., Containers as a Service (CaaS) and Platform as a Service (PaaS) profiles, can also need to be applied.

According to an example embodiment of the present disclosure, the IMS can install the components of CaaS and PaaS layers based on the provided profile.

According to an example embodiment of the present disclosure, in the case the PaaS and CaaS installations are provided by the cloud provider, the IMS can use the CaaS and PaaS profiles to validate whether the installed components and versions are compatible with the ones defined in the profile.

BRIEF DESCRIPTION OF THE DRAWINGS

FIG. 3 is a diagram illustrating an example embodiment of a Serv1_Mdl1 Compute profile.

DETAILED DESCRIPTION OF THE INVENTION

RAN Network Functions (NFs) (or other NFs) can be deployed on private cloud or public cloud. Infrastructure used in such cloud deployments could be from different commercial off-the-shelf (COTS) vendors or RAN-specific white-box vendor and the corresponding capabilities in terms of networking and acceleration will not be the same.

This poses a requirement that the infrastructure of the cloud should be setup to cater to the requirements of either CU or DU or any other NFs that will get deployed on the cloud. From deployment perspective, the RAN NFs should see a similar environment irrespective of the underlying hardware/cloud. In addition to this, the requirements for deployment will be different a) for different NF nodes or b) the deployment modes like Data center or Edge.

It is essential for the Infrastructure Management Systems (IMS) to ensure that each infrastructure such as compute and networking in the Cloud are configured correctly (i.e., compliant) in terms of, e.g.:

basic input/output system (BIOS) settings;
  Grand Unified Bootloader (GRUB) settings;
  Performance parameters;
  Accelerators;
  Network Interface Cards (NICs); and
  Storge configuration (including partitions).

According to the present disclosure, an example method is presented which can enable a controlled mechanism of i) applying the required set of settings (e.g., for cloud-based network infrastructure hardware (HW) type and/or HW configuration) by means of "profiles" and/or data models, and ii) monitoring the settings to ensure that these settings are compliant before deploying RAN NFs. Profiles can be categorized into, e.g., Compute, Networking, Accelerator, Storage and Application ("App") types.

Figure 1:
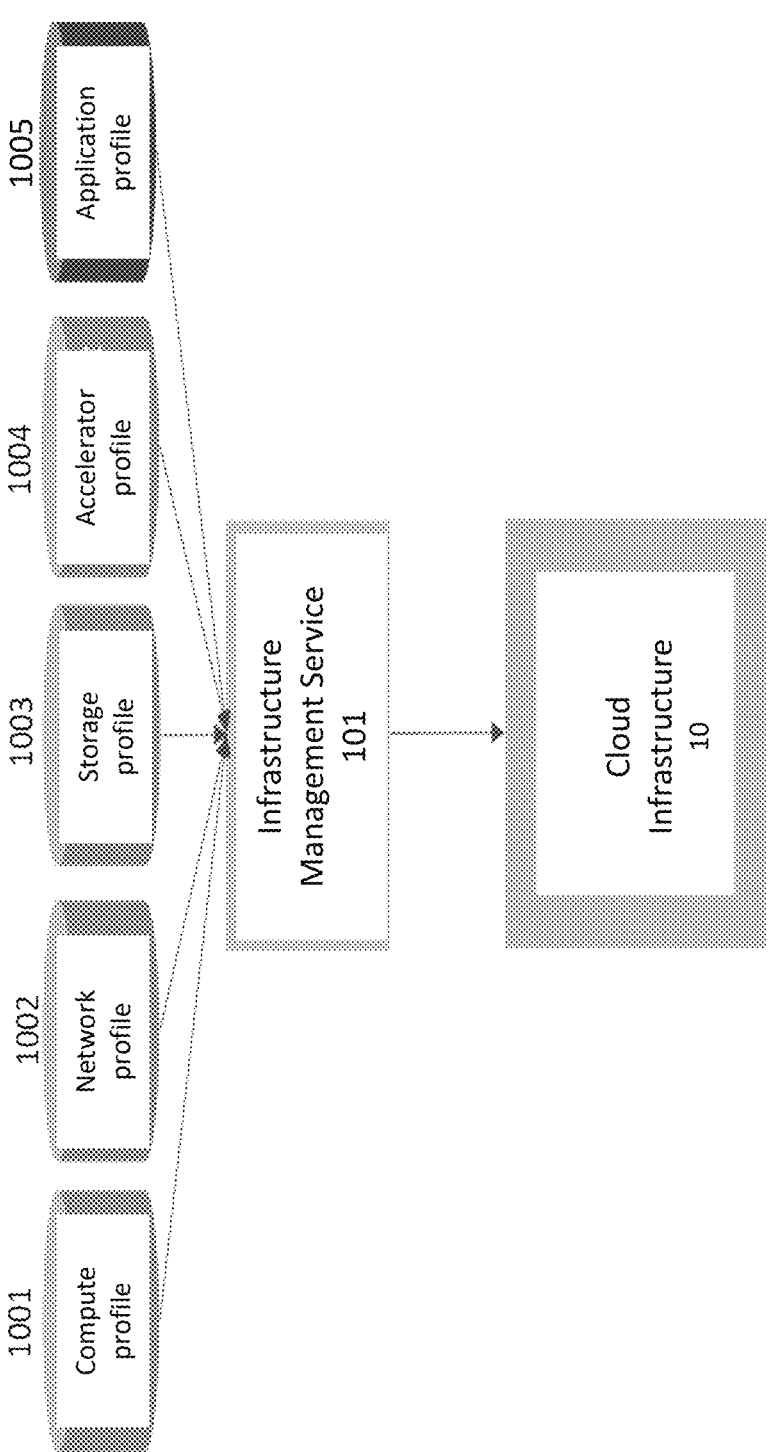
FIG. 1 is a block diagram illustrating how an example embodiment of a profile-based cloud infrastructure setup is implemented.

FIG. 1 is a functional block diagram illustrating how an example embodiment of a profile-based cloud infrastructure setup is implemented. As shown in FIG. 1, Infrastructure Management Service 101 applies one or more of Compute profile 1001, Network profile 1002, Storage profile 1003, Accelerator profile 1004, and Application ("App") profile 1005 to cloud infrastructure 10 (also referred to as simply "infrastructure"). Each profile type will be discussed in detail below.

Figure 2:
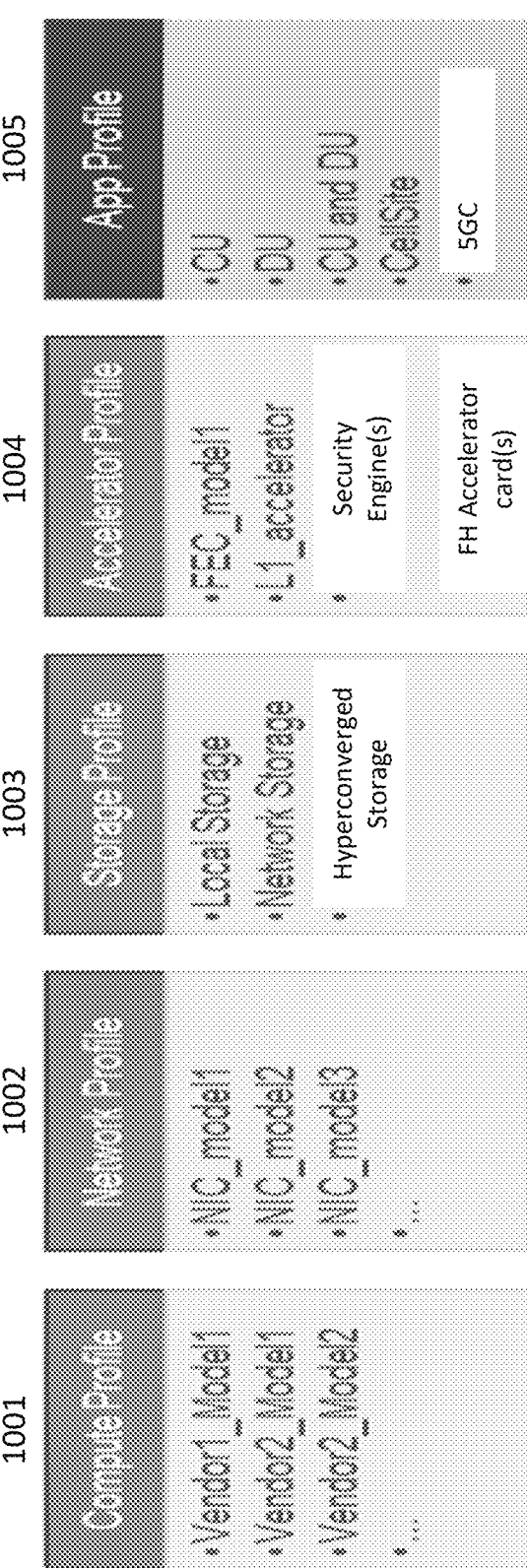
FIG. 2 is an illustration of example classifications of profiles.

Compute profile(s): Multiple Profiles can be defined, one each for vendor/model type, e.g., vendor1_model1, vendor2_model1, vendor2_model2, etc., as shown in FIG. 2 for "Compute Profile" 1001, and will reflect the required BIOS settings, Grub settings, Kernel parameters to be set, for example. It should be noted that with Private and Public clouds, the set of allowed modifications will be different, and therefore Compute profiles will accordingly define the allowed set of modifications (or tunings) required.

Network profile(s): Multiple Profiles can be defined, one each for network interface card (NIC) model, e.g., NIC_model1, NIC_model2, NIC_model3, etc., as shown in FIG. 2 for "Network Profile" 1002, and will capture the required interface names and set of resources such as virtual functions (VFs), for example.

Storage Profile(s): Multiple Profiles can be defined for different storage classes and storage models, e.g., network storage, hyperconverged storage, local storage, etc., as shown in FIG. 2 for "Storage Profile" 1003.

Accelerator profile(s): Multiple Profiles can be defined for each of, e.g., forward error correction (FEC), inline L1 Accelerators, Security Engines, and/or Fronthaul (FH) Accelerator cards, as shown in FIG. 2 for "Accelerator Profile" 1004, and will capture the required set of resources like virtual functions (VFs). Typically, accelerators are specialized hardware that can be used to offload processing from applications that run on general-purpose central processing units (CPUs). Accelerators can be implemented as application specific integrated circuit (ASIC), field-programmable gate array (FPGA), digital signal processor (DSP) or graphics processing unit (GPU), for example.

Application Profile(s): Application profiles are for various deployments, e.g., CU, DU, 5G Core (5GC), and cell site, as shown in FIG. 2 for "App Profile" 1005, and will capture the specifics required for the particular deployment, like BIOS settings.

Generic Profile(s): One additional type of profile (not shown in FIG. 2), Generic Profile, includes, e.g., Container-as-a-Service (CaaS) profile(s) and Platform-as-a-Service (PaaS) profile(s) that capture all the CaaS and PaaS components that are required for application deployment.

Based on the infrastructure used, e.g., compute server type, networking supported, accelerators used, and deployment scenario, the IMS will pick the appropriate profiles and apply them to the cloud infrastructure, e.g., as shown in FIG. 1. Once the cloud infrastructure has been prepared, they can be used for deployment of RAN nodes. IMS will also regularly audit the cloud for compliance with the profiles that have been applied. Capabilities of each of the infrastructure used in the cloud can be different in terms of capabilities such as extended instructions, cache technology, performance attributes, and offload, for example. IMS will also be able to query the cloud infrastructure for its capabilities and enable parameters based on vendor type and capability.

According to an example embodiment of the present disclosure, the following set of procedures are defined to achieve the profile-based infrastructure management: a) profile definition; b) cloud-infrastructure-preparation based on profile(s); c) cloud audit and monitoring; and d) cloud preparation based on capability. Each of these procedures will be discussed in detail below.

Profile Definition involves defining profiles as Yet Another Markup Language (YAML) format files, which files are used and/or interpreted by the IMS. FIG. 3 illustrates an example profile definition for a vendor 1 (implemented as server 1 in this example), model 1 (denoted as "Serv1_Mdl1") Compute profile. In this example profile definition, the BIOS settings are as follows:

Virtualization technology is enabled;
  Last Level Cache (LLC) (also referred to as a third level cache) prefetch is enabled;
  Turbo boost feature (dynamic frequency scaling feature for central processing units (CPUs) that automatically raises certain versions of its operating frequency when demanding tasks are running) is enabled;
  Uncore (i.e., functions of a microprocessor that are not in the core) frequency is at maximum; and
  Energy efficient policy is set to "performance" setting.

In the example shown in FIG. 3, the Grand Unified Bootloader (GRUB) settings are as follows:

input-output memory management unit (IOMMU), e.g., Intel™ IOMMU, is ON;
  huge memory page size is set to 1 gigabyte (GIG);
  number of huge pages is set to 16; and
  "isolcpus" parameter setting (which defines a set of CPUs where the kernel processes scheduler will not interact with those CPUs) is 3-51, 55-103.

In the example shown in FIG. 3, the system message parameters ("sysparam") settings are as follows:

MSGMNI parameter ("kernel.msgmni"), which specifies the number of agents that can be started, is set to 512;
  MSGMAX parameter ("kernel.msgmax"), which specifies the size of the message (in bytes) that can be sent in a queue, is set to 26194304;
  MSGMNB parameter ("kernel.msgmnb"), which specifies the size of the queue (in bytes), is set to 263886080;
  "fs.file-max" parameter, which specifies the maximum File Descriptors (FD) enforced on a kernel level, is set to 5242880; and "fs.nr_open" parameter, which specifies the current number of open File Descriptors (FD), is 5242880.

Figure 4:
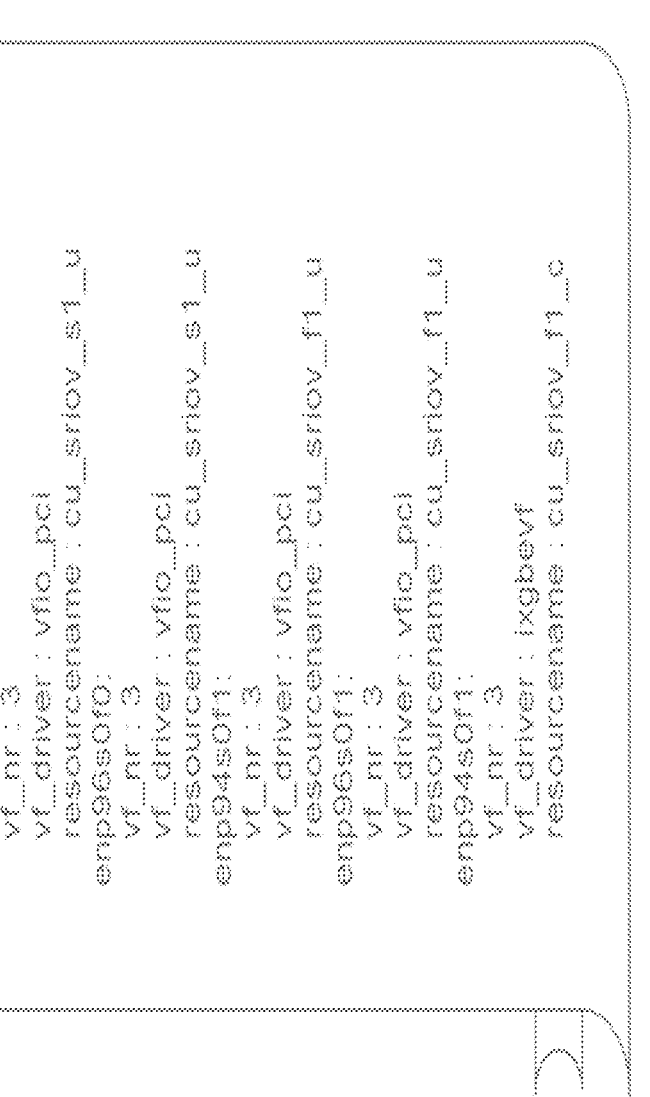
FIG. 4 is a diagram illustrating an example embodiment of a NIC1_Mdl1 Network Profile.

FIG. 4 is a diagram illustrating an example embodiment of NIC_model1 ("NIC1_Mdl1") network profile. First, two interface aliases are provided: "enp94s0f0" is the alias for default Kubernetes (K8s) interface (default_k8s_intf); and "enp94s0f1" is the alias for default Operations, administration and management/maintenance (oam) interface (default_oam_intf). Next, virtual function map (vf_map) involving multiple interfaces is provided. For interface enp94s0f0, the following are specified: virtual function number (vf_nr) is 3; virtual function driver (vf_driver) is virtual function input/output peripheral component interconnect (vfio_pci); and the resource name is specified as "cu_sriov_s1-u" (sriov being the acronym for Single Root I/O Virtualization). For interface enp96s0f0, the following are specified: virtual function number (vf_nr) is 3; virtual function driver (vf_driver) is virtual function input/output peripheral component interconnect (vfio_pci); and the resource name is specified as "cu_sriov_s1-u". For interface enp94s0f1, the following are specified: virtual function number (vf_nr) is 3; virtual function driver (vf_driver) is virtual function input/output peripheral component interconnect (vfio_pci); and the resource name is specified as "cu_sriov_f1-u". For interface enp96s0f1, the following are specified: virtual function number (vf_nr) is 3; virtual function driver (vf_driver) is virtual function input/output peripheral component interconnect (vfio_pci); and the resource name is specified as "cu_sriov_f1-u". For interface enp94s0f1, the following are additionally specified: virtual function number (vf_nr) is 3; virtual function driver (vf_driver) is "ixgbevf" (which is a virtual function driver from Intel™); and the resource name is specified as "cu_sriov_f1-c".

Figure 5:
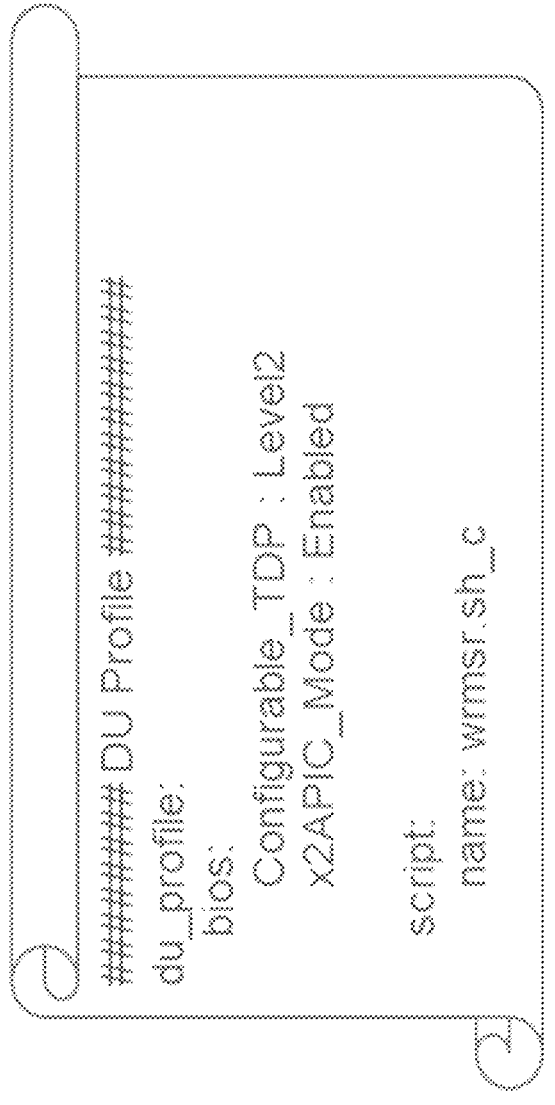
FIG. 5 is a diagram illustrating an example embodiment of a DU Application Profile.

FIG. 5 is a diagram illustrating an example embodiment of a DU Application Profile. In this example, the DU application profile ("du_profile") is specified with BIOS parameters and script parameter. For BIOS, Configurable Thermal Design Power (Configurable_TDP) is set to Level 2, and "x2APIC_MODE" (which is Advanced Programmable Interrupt Controller mode) is enabled. For script, the name is specified as "wrmsr.sh_c" (wrmsr being an acronym for Write to Machine Specific Register, which is a tool for writing values to CPU machine specific registers.

According to an example embodiment of the present disclosure, IMS can query every cloud infrastructure and obtain information about the hardware capabilities such as Compute, Networking, etc., and whether any accelerator cards are used. IMS can pick the appropriate profile(s) and apply them to each of the cloud infrastructure(s). Applying of a profile can involve one or more of the following actions: update the BIOS settings, e.g., using Intelligent Platform Management Interface (IPMI) commands; update the GRUB settings; update the system/kernel parameters; update interfaces (e.g., alias, bonding, etc.); create required resources (e.g., virtual functions (VFs) and corresponding bindings); create resource maps to be used by plug-ins; and run any scripts for custom needs of the RAN application. Typically, the IMS would be preparing multiple such clouds. Profiles applied to each infrastructure in a cloud could be the same or different based on the deployment scenario that the infrastructure will cater to.

Figure 6:
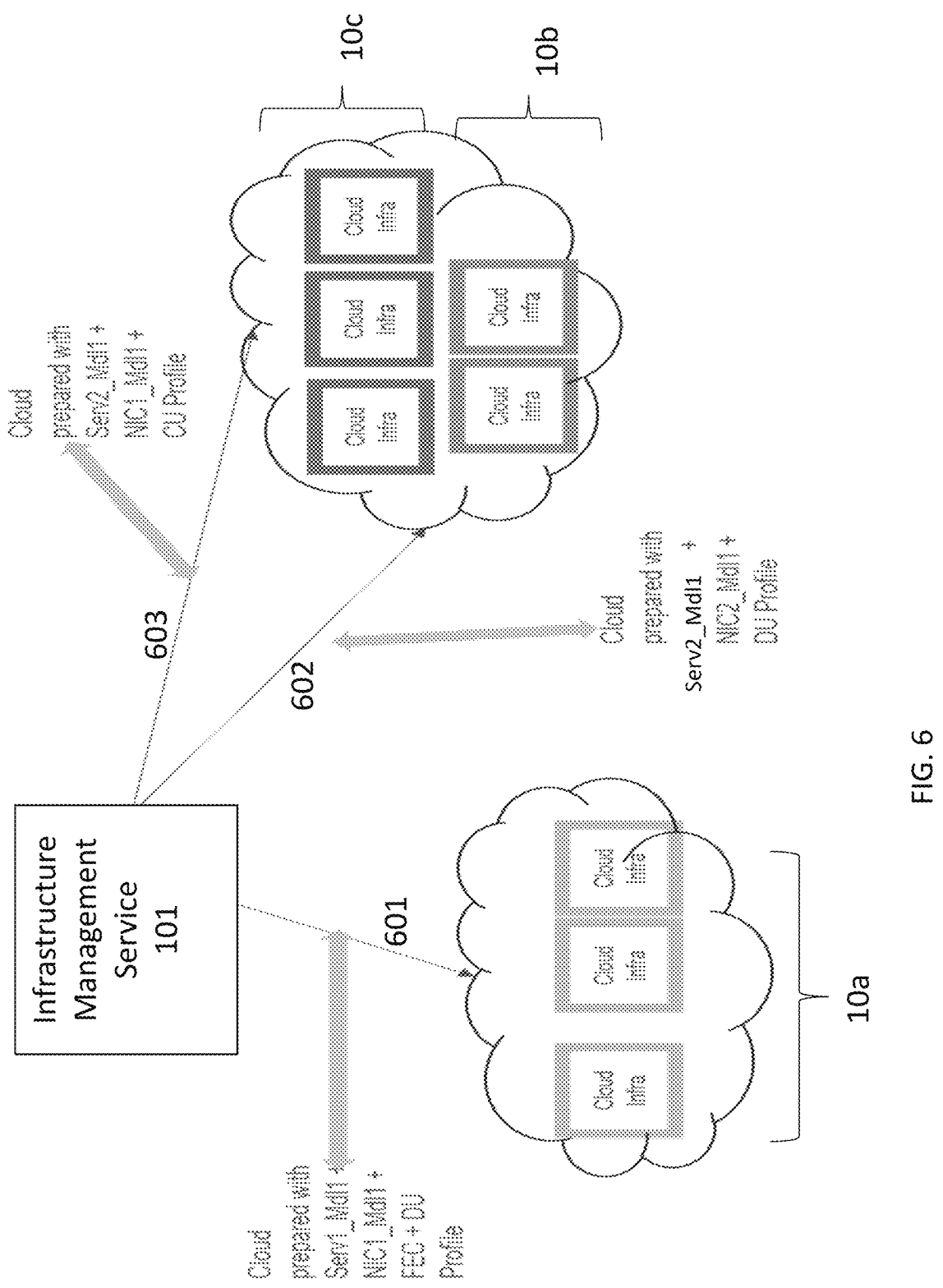
FIG. 6 is a block diagram illustrating the IMS interaction with the cloud infrastructure and various profiles.

FIG. 6 is a block diagram illustrating an example of the IMS interaction with the cloud infrastructure and various profiles. In this example, multiple cloud infrastructures 10*a*, 10*b* and 10*c* are prepared by IMS 101, e.g., as shown by the process arrows 601, 602 and 603. As shown by the process arrow 601, the IMS 101 applies the following profiles to cloud infrastructures 10*a*: Serv1_Mdl1; NIC1_Mdl1; FEC; and DU. As shown by the process arrow 602, the IMS 101 applies the following profiles to cloud infrastructures 10*b*: Serv2_Mdl1; NIC2_Mdl1; and DU. As shown by the process arrow 603, the IMS 101 applies the following profiles to cloud infrastructures 10*c*: Serv2_Mdl1; NIC1_Mdl1; and CU.

Figure 7:
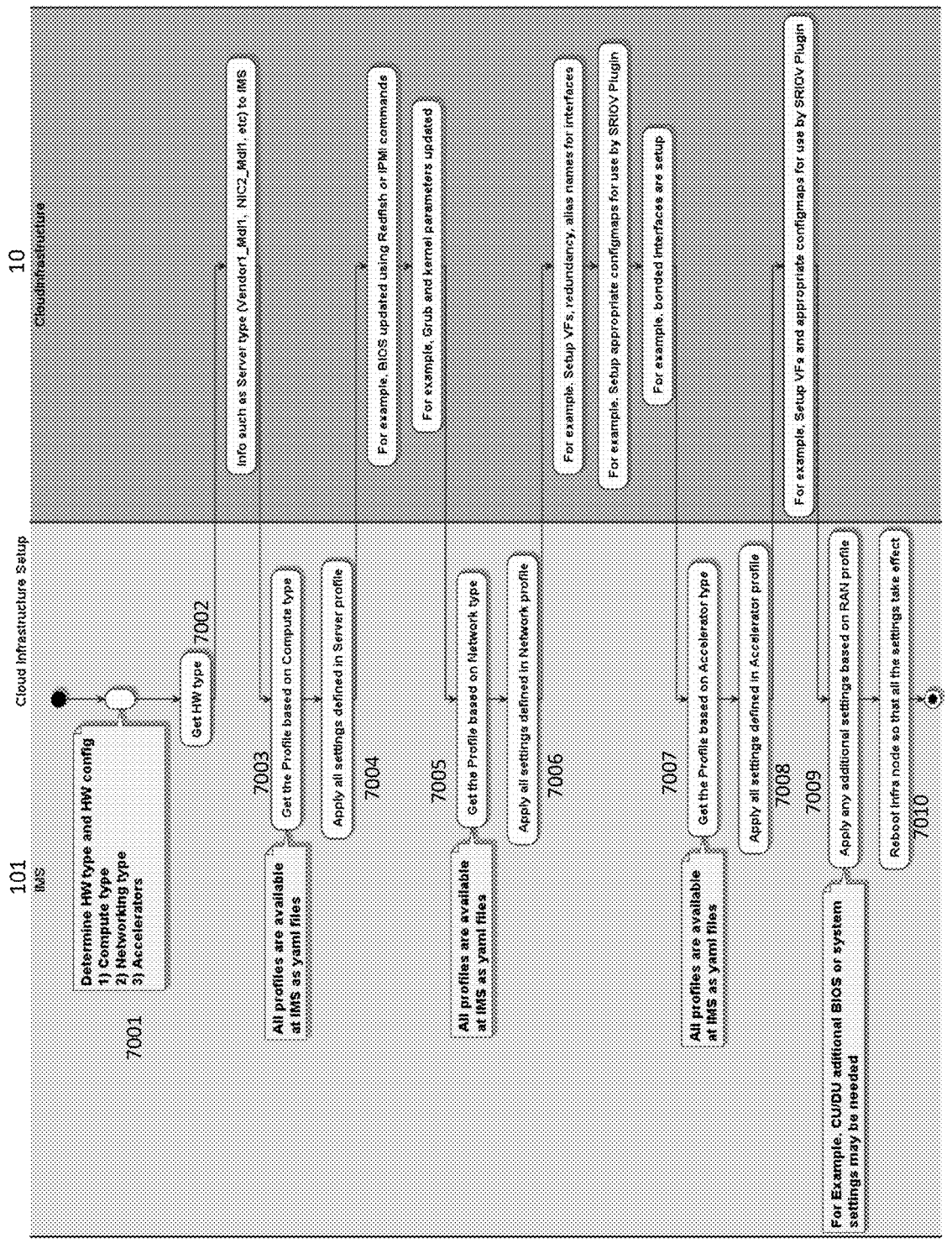
FIG. 7 illustrates a flow diagram for a cloud infrastructure setup.

FIG. 7 illustrates a flow diagram for a cloud infrastructure setup. As shown in the functional block 7001, IMS 101 determines hardware (HW) type and HW configuration, including, e.g., 1) compute type, 2) networking type, and 3) accelerators. At the functional block 7002, HW type information is obtained by the IMS 101 from the cloud infrastructure 10, e.g., information such as server type (Vendor1_Mdl1, NIC2_Mdl1, etc. At the functional block 7003, the IMS 101 retrieves the relevant profile based on the determined compute type (as noted in FIG. 7, all profiles are available at the IMS as yaml files). At the functional block 7004, the IMS applies all relevant settings defined in the server profile, including, e.g., i) updating BIOS using Redfish™ commands or IPMI commands, and ii) updating GRUB and/or kernel parameters. At the functional block 7005, the IMS 101 retrieves the relevant profile based on the determined networking type. At the functional block 7006, the IMS 101 applies all settings defined in the networking profile, including, e.g.: i) set up VFs, redundancy, and aliases for interfaces; ii) set up appropriate configuration maps for use by single root input/output virtualization (SRIOV) plug-in; and iii) set up bonded interfaces. At the functional block 7007, the IMS 101 retrieves the relevant profile based on the determined accelerator type. At the functional block 7008, the IMS 101 applies all settings defined in the accelerator profile, including, e.g., set up VFs and appropriate configuration maps for use by SRIOV plug-in. At the functional block 7009, the IMS 101 applies any additional settings based on Radio Access Network (RAN) profile (e.g., additional BIOS or system settings for CU and/or DU). At the functional block 7010, the IMS reboots the cloud infrastructure node so that all the applied settings take effect.

In addition to preparing a cloud infrastructure based on specific Hardware (HW) profiles, there are generic profiles, i.e., Containers as a Service (CaaS) and Platform as a Service (PaaS) profiles that also can be applied. An application is validated on a cloud with a specific set of CaaS and PaaS components and versions. The CaaS and PaaS profiles provide the information regarding CaaS and PaaS components and versions. According to an example embodiment of the present disclosure, the IMS can use the generic profiles in the following ways:

a) Install the components of CaaS and PaaS layers based on the provided profile.

b) In certain cases, the PaaS and CaaS installations are provided by the cloud provider. In such a scenario, the IMS will use the CaaS and PaaS profiles to validate whether the installed components and versions are compatible with the ones defined in the profile.

Figure 8:
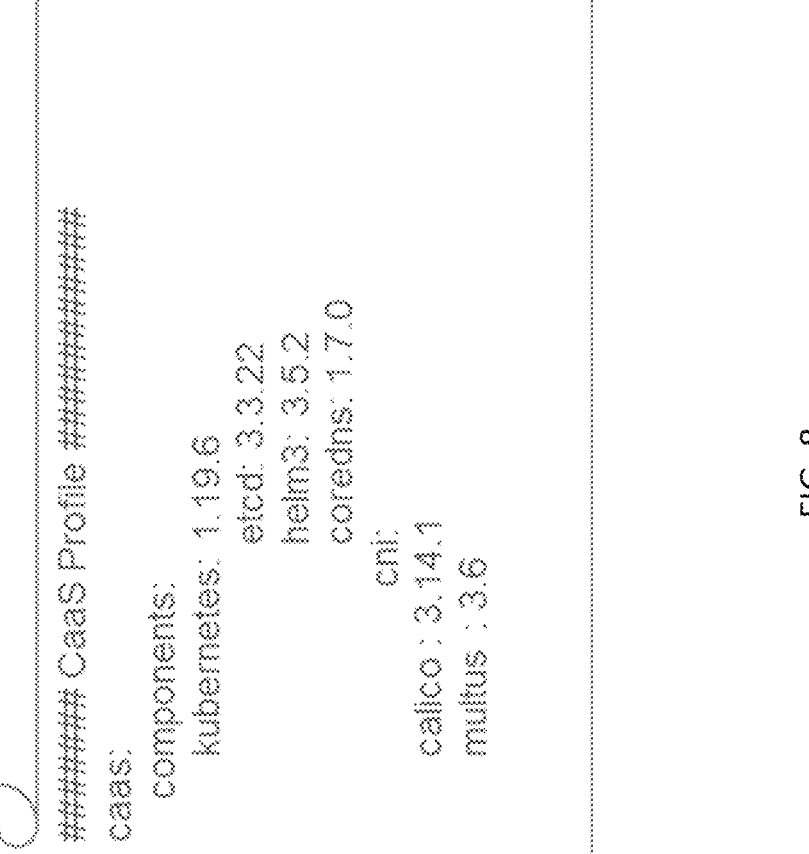
FIG. 8 illustrates an example of a CaaS profile.

FIG. 8 illustrates an example of a CaaS profile. Among the included components in the profile is Kubernetes version 1.19.6 (Kubernetes is a portable, extensible, open source platform for managing containerized workloads and services, which platform facilitates both declarative configuration and automation). For this example version of Kubernetes, the following are utilized: i) etcd version 3.3.22 (etcd is the database system that's used for storing cluster state, networking information, and other persistent information); ii) helm3 version 3.5.2 (Helm Charts are simply Kubernetes YAML manifests combined into a single package); and coredns version 1.7.0 (CoreDNS is a flexible, extensible domain name system (DNS) server that can serve as the Kubernetes cluster DNS). Kubernetes uses container Network Interface (cni) to enable the networking. In this example embodiment, cni includes: Calico™ version 3.14.1 (which is an open source networking plug-in solution for containers) and Multus™ version 3.6 (Multus is a CNI plug-in for Kubernetes that enables attaching multiple network interfaces to pods).

Figure 9:
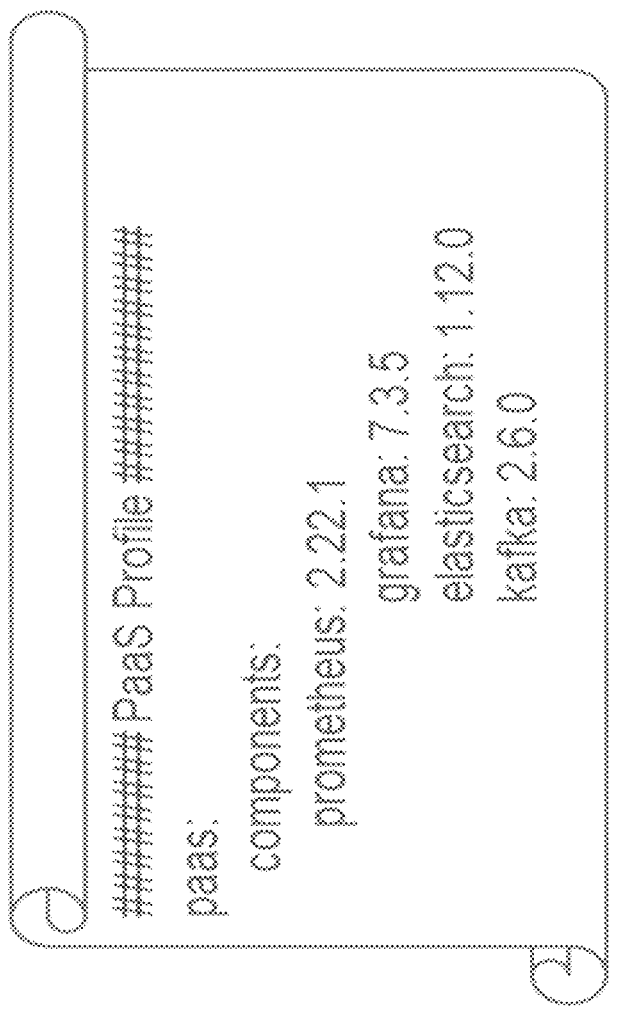
FIG. 9 illustrates an example of a PaaS profile.

FIG. 9 illustrates an example of a PaaS profile. In this example profile, Prometheus™ version 2.22.1 is utilized (Prometheus™ is an open-source systems monitoring and alerting toolkit). In addition, the following components are utilized in conjunction with Prometheus™: i) Grafana™ version 7.3.5 (Grafana™ is a visualization and analytics tool that can process metrics data into visual data, e.g., graphs and charts); ii) Elasticsearch™ version 1.12.0 (Elasticsearch™ stack is used to collect, store, analyze, and visualize application logs); and iii) Apache Kafka™ version 2.6.0 (Apache Kafka™ is an event streaming platform used to collect, process, and store streaming event data or data that has no discrete beginning or end, i.e., continuously processing streams of events as they are created).

According to an example embodiment of the present disclosure, the IMS can regularly audit the cloud to validate compliance against the applied profiles. The IMS can flag compliance and non-compliance data towards the management systems to provide an alert for mis-matching cloud infrastructure. In addition, IMS can query the cloud infrastructure to retrieve the capability in terms of processor type, Cache technology, performance attributes, offload engines etc. Based on the cloud infrastructure capability, IMS will apply any configuration to utilize those capabilities.

According to an example embodiment of the present disclosure, the remote update of basic input/output system (BIOS) settings can be supported by multiple mechanisms, including, e.g., Intelligent Platform Management Interface (IPMI), RedFish™, etc. In this case, the IMS will use the appropriate mechanism supported by the server vendor. In addition, redundancy of the interfaces on cloud infrastructure can be set up by multiple ways, e.g., bonding, load balancing, etc. Redundancy can also be designed to be handled at application level rather than at interface level, and the IMS should support configuring both options.

The example embodiments of the methods disclosed in the present disclosure are directed to providing a common deployment environment on the Cloud (both private and Public) irrespective of the underlying hardware used. Although the example embodiments have been described in the context of RAN use cases, the present disclosure is not limited to the RAN use cases, and can also be applicable for any cloud-based use cases such as Packet Cores, Edge applications and other cloud-based communication network functions (NFs).

The invention claimed is:

1. A method of providing a common deployment mechanism for applying settings for cloud-based network infrastructure comprising Radio Access Network (RAN) for one of 4G or 5G mobile network, the method comprising:
  determining, by an Infrastructure Management Service (IMS) component of the mobile network, hardware (HW) type information and HW configuration of the cloud-based network infrastructure, wherein the HW configuration includes a compute type, a networking type, and an accelerator card type, and wherein the HW type information includes a compute server type identifying vendor and model, the accelerator card being a specialized hardware configured to offload processing from applications running on general-purpose central processing units;
  applying, by the IMS component, a plurality of profiles including at least a compute profile, a network profile, and an accelerator profile to the cloud-based network infrastructure based on the determined HW type and HW configuration; and
  auditing, by the IMS component, the cloud-based network infrastructure to validate compliance with the applied profiles;
  wherein the step of determining, by the IMS component, includes querying the cloud-based network infrastructure to obtain information about the HW configuration of the cloud-based network infrastructure and whether accelerator cards are used, and wherein the step of applying, by the IMS component, the plurality of profiles is based on the information obtained through the querying of the cloud-based network infrastructure.

2. The method according to claim 1, wherein the applying of the plurality of profiles based on the at least one of the HW type and HW configuration enables the at least one profile to be compliant with relevant settings of the cloud-based network infrastructure including at least one of: basic input/output system (BIOS) settings; Grand Unified Bootloader (GRUB) settings; performance parameters; accelerators; Network Interface Cards (NICs); and storge configuration.

3. The method according to claim 1, further comprising:
  applying, by the IMS component, at least one of Container as a Service (CaaS) profile and a Platform as a Service (PaaS) profile.

4. The method according to claim 1, wherein the applying of the plurality of profiles includes at least one of the following actions: updating basic input/output system (BIOS) settings; updating Grand Unified Bootloader (GRUB) settings; updating at least one of system parameters and kernel parameters for the cloud-based network infrastructure; updating interfaces; creating resources including virtual functions (VFs); and creating resource maps to be used by plug-ins.

5. The method according to claim 4, wherein the updating of the BIOS settings is achieved by using Intelligent Platform Management Interface (IPMI) commands.

6. The method of claim 1, further comprising:
  applying, by the IMS component to the cloud-based network infrastructure, at least one further profile comprising at least one of a storage profile and an application profile, based on the HW type and HW configuration.

7. The method of claim 1, wherein the applying of the network profile by the IMS component comprises at least one of:
  setting up a virtual function (VF);
  setting up an alias for an interface;
  setting up a configuration map for use by a single root input/output virtualization (SRIOV) plug-in; and
  setting up a bonded interface.

8. The method according to claim 4, wherein the applying of the network profile by the IMS component comprises at least one of:
  setting up a virtual function (VF);
  setting up an alias for an interface;
  setting up a configuration map for use by a single root input/output virtualization (SRIOV) plug-in; and
  setting up a bonded interface.

9. The method of claim 1, wherein:

the applying of the accelerator profile by the IMS component includes at least one of:

setting up a virtual function (VF); and setting up a configuration map for use by a single root input/output virtualization (SRIOV) plug-in.

10. The method of claim 4, wherein:

the applying of the accelerator profile by the IMS component includes at least one of:

setting up a virtual function (VF); and setting up a configuration map for use by a single root input/output virtualization (SRIOV) plug-in.

11. The method according to claim 1, further comprising:

applying, by the IMS component, at least one additional setting based on Radio Access Network (RAN) profile for the cloud-based network infrastructure.

12. The method according to claim 11, further comprising:

applying, by the IMS component, at least one of Container as a Service (CaaS) profile and a Platform as a Service (PaaS) profile.

13. The method according to claim 4, further comprising:

applying, by the IMS component, at least one additional setting based on Radio Access Network (RAN) profile for the cloud-based network infrastructure.

14. The method according to claim 13, further comprising:

applying, by the IMS component, at least one of Container as a Service (CaaS) profile and a Platform as a Service (PaaS) profile.

15. The method according to claim 4, further comprising:

applying, by the IMS component, at least one of Container as a Service (CaaS) profile and a Platform as a Service (PaaS) profile.

16. The method of claim 3, further comprising:

auditing, by the IMS component, the cloud-based network infrastructure to validate compliance with the applied at least one profile.

17. The method of claim 16, wherein the HW configuration includes at least one of compute type, networking type, and accelerators.

18. The method according to claim 17, wherein the HW type information includes server type.

19. The method of claim 15, wherein:

the applying of the network profile by the IMS component includes at least one of: setting up a virtual function (VF); setting up an alias for an interface; setting up a configuration map for use by a single root input/output virtualization (SRIOV) plug-in; and setting up a bonded interface.

20. The method of claim 16, wherein:

the applying of the network profile by the IMS component includes at least one of: setting up a virtual function (VF); setting up an alias for an interface; setting up a configuration map for use by a single root input/output virtualization (SRIOV) plug-in; and setting up a bonded interface.

* * * * *